United States Patent
Feoktistov et al.

(10) Patent No.: US 7,092,046 B2
(45) Date of Patent: Aug. 15, 2006

(54) OPTICALLY ADDRESSED SPATIAL LIGHT MODULATOR (OASLM) WITH DIELECTRIC MIRROR COMPRISING LAYERS OF AMORPHOUS HYDROGENATED CARBON

(75) Inventors: Nikolai Alexandrovich Feoktistov, St. Petersburg (RU); Arkady Pavlovich Onokhov, St. Petersburg (RU); Elena Anatolievna Konshina, St. Petersburg (RU)

(73) Assignee: Qinetiq Limited, (GB)

( * ) Notice: Subject to any disclaimer, the term of this patent is extended or adjusted under 35 U.S.C. 154(b) by 60 days.

(21) Appl. No.: 10/471,472

(22) PCT Filed: Mar. 11, 2002

(86) PCT No.: PCT/GB02/00958

§ 371 (c)(1),
(2), (4) Date: Apr. 19, 2004

(87) PCT Pub. No.: WO02/073303

PCT Pub. Date: Sep. 19, 2002

(65) Prior Publication Data

US 2004/0160539 A1    Aug. 19, 2004

(30) Foreign Application Priority Data

Mar. 13, 2001  (RU) .............................. 2001106945
Jun. 20, 2001  (GB) ................................ 0114972.3

(51) Int. Cl.
*G02F 1/135*  (2006.01)
(52) U.S. Cl. ............................. 349/25; 349/27; 349/29; 349/30
(58) Field of Classification Search ............. 349/25–30
See application file for complete search history.

(56) References Cited

U.S. PATENT DOCUMENTS

| | | | |
|---|---|---|---|
| 5,245,453 A * | 9/1993 | Hatano et al. | 349/27 |
| 5,640,260 A * | 6/1997 | Sumida | 349/26 |
| 6,338,882 B1 * | 1/2002 | Dultz et al. | 427/580 |

FOREIGN PATENT DOCUMENTS

EP    0 412 843    2/1991

* cited by examiner

*Primary Examiner*—James A. Dudek
(74) *Attorney, Agent, or Firm*—McDonnell Boehnen Hulbert & Berghoff LLP

(57) ABSTRACT

A reflective type liquid crystal optically addressed spatial light modulator has a first transparent substrate (1b), a first transparent electrode (2b) formed on the first transparent substrate (1b) and a photosensitive layer (3) formed on the first transparent electrode, formed from materials including hydrogenated amorphous silicon carbide (a-Si:C:H). A readout light-blocking layer (4) is formed on top of the photosensor layer (3) and is formed from amorphous hydrogenated carbon (a-C:H). The high reflectance dielectric multilayer mirror (5) is formed on top of the light-blocking layer (4) and can be made of alternating the a-Si:C:H layers with a higher refractive index and the a-C:H layers with lower reflective index. The modulator also has a second transparent substrate (1a), a second transparent electrode (2a) formed on the second transparent substrate (1a), and a liquid crystal layer (8) disposed between the dielectric mirror (5) and the second transparent electrode (2a). The invention allows more efficient separation of the input and read lights and increases the read light reflection, resulting in improvements to the input sensitivity, resolution, contrast ratio, and diffraction efficacy.

13 Claims, 2 Drawing Sheets

OPTICALLY ADDRESSED SPATIAL LIGHT MODULATOR (OASLM) WITH DIELECTRIC MIRROR COMPRISING LAYERS OF AMORPHOUS HYDROGENATED CARBON

This invention relates to the field of optically addressed spatial light modulators. More particularly, the invention relates to a reflective type optically addressed spatial light modulator (OASLM), and a method for manufacturing such a device.

Optically addressed spatial light modulators (OASLMs) using liquid crystals as the modulating material exhibit high speed and high resolution performance and are important in many areas. In terms of design, they are basically a plane sandwich-like structure. Such a device includes a pair of glass substrates facing each other. Each of the substrates is provided with a transparent electrode on the facing side.

On the first transparent electrode, there is formed a photosensitive layer. A photosensitive layer is an essential component of an OASLM. Light incident upon this photosensitive layer causes its electrical resistance to reduce in comparison to its resistance in zero light conditions. This resistance change causes a redistribution of any potentials present across the device. Hydrogenated amorphous silicon (a-Si:H) photosensors, in both photoconductor and photodiode configurations, are used in transmissive and reflective OASLMs. An amorphous hydrogenated silicon carbide (a-Si:C:H) photosensor differs from the a-Si:H photosensor in terms of its higher photosensitivity, dark resistivity, and transmittance for visible light.

On top the photoconductive layer there may be interposed a light absorbing layer for more effective optical isolation between the write and read lights of a reflective OASLM A dielectric mirror layer is formed next to the light-blocking layer. The dielectric mirror layer is made from multiple layer films with alternating, different, refractive indices. The mirror increases the reflection for the read light, making the device more optically efficient.

A pair of orientation films are formed on the dielectric mirror layer and the second transparent electrode. A liquid crystal layer is disposed between the orientation films and sealed by use of a sealing member, which also functions as a spacer, and attaches the glass substrates to each other.

One problem that exists in the OASLMs described above is a lack of adhesion between the photoconductor layer, the light blocking layer and the dielectric multilayer mirror. Also, the manufacture of the photoconductor, the light blocking layer and the dielectric multilayer mirror structure is rather difficult and complicated, since the production of such a multiple layer structure requires different processing stages for each layer.

According to the present invention there is provided an optically addressed spatial light modulator (OASLM) comprising:

a first transparent substrate; a first transparent electrode formed on said first transparent substrate; a photoconductive layer formed on the first transparent electrode consisting of hydrogenated amorphous silicon carbide; a light-blocking layer formed on said photoconductive layer and consisting of hydrogenated amorphous carbon; a dielectric mirror layer, itself having a multiple layer structure formed on said light-blocking layer; a second transparent substrate upon which is formed a second transparent electrode, and between said second electrode and the dielectric mirror a liquid crystal layer and orientation means therefore;

characterised in that the light-blocking layer consists of hydrogenated amorphous carbon.

A light blocking layer made of hydrogenated amorphous carbon as per the current invention provides for a very efficient light barrier. This efficient barrier allows the effective image resolution to be increased. It also provides for good isolation of the write light from the read light, which again improves the optical parameters of the OASLM.

The materials used in the photoconductor, light blocking layer and dielectric mirror are closely related, which allows for the manufacture of the devices to be simplified. The manufacturing stages needed are much reduced, as the production of these layers all use very similar processes. Therefore the device does not need to be moved between differing processes as much during its manufacture. The simplified manufacturing procedure results in a cheaper and more reliable product. The use of very similar materials for these components also ensures good adhesion between these layers, again resulting in improved reliability.

The invention incorporates a photoconductive layer formed from hydrogenated amorphous silicon carbide (a-Si:C:H). This can be formed, for example, by means of a plasma activated CVD (chemical vapour deposition) method, by use of a gas including silane (Sir), hydrogen ($H_2$), methane (Ce) or acetylene ($C_2H_2$). The conductivities in the finished OASLM of the photoconductive layer in dark and bright conditions can be set to required values by controlling the gas flow volume ratio of the gases during formation of the layers. The conductivity of the photoconductive layer in the dark condition is of the same order as the conductivity of the liquid crystal layer, which is about $10^{-10}$ to $10^{-12}$ S/cm. The impedance of the photoconductive layer and the liquid crystal layer are also of the same order.

The light-blocking layer is formed using hydrogenated amorphous carbon (a-C:H). Such a light-blocking layer has a good characteristic of light absorption in the visible region and can be made, for example, from hydrogenated material including $C_2H_2$ by means of a plasma activated CVD method. The adhesion ability between the light-blocking layer and the a-Si:C:H photoconductive layer is thus improved over the prior art, and this provides for better image resolution.

The liquid crystal (LC) optically addressed spatial light modulator (OASLM) of the present invention has a high reflectance multilayer mirror which can be made of alternating the a-Si:C:H layers, which have a higher refractive index with the a-C:H layers, which have a lower refractive index. Such a dielectric mirror layer can be formed, for example, by means of a plasma activated CVD method using gases including silane ($SiH_4$), hydrogen ($H_2$), and methane ($CH_4$), acetylene ($C_2H_2$) or other hydrogenated gas and liquid material. The refractive index of the a-Si:C:H layer can be set as required by controlling the flow rates or ratios of the material gases. We have found that using the above technique provides a particularly high reflectance mirror when seven layers are employed, although the present invention is not limited to a mirror having this number of layers. Preferably, the conductivity of the dielectric mirror is set between $10^{-9}$ to $10^{-12}$ S/cm. The conductivity and light absorption of the a-C:H layers may be set by the rate at which they are deposited. A slower rate will result in an increased conductivity, but will produce a layer that is more absorptive of light. Conversely, increasing the rate of deposition will decrease conductivity, but produce a more transparent layer. The conductivity of the a-Si:C:H layers may be set by controlling the ratios or flow rates of the material gases.

The current invention allows for the inclusion of a plurality of light blocking layers. Preferably any additional light blocking layers are incorporated within the layers of the dielectric mirror. The a-C:H layers within the mirror can be made partially light blocking, without degrading the performance of the mirror beyond acceptable limits. To do this, parameters such as flow rate and material gas ratios may be adjusted during the processing of the a-C:H layers, as described above, to reduce the amount of light that can pass through the layer below that which would normally be chosen. Although all layers of the mirror will impede light to some degree, in this context, a partially light blocking layer is one in which the amount of absorption is made greater than that which would be optimal in a dielectric mirror. The absorption of each of these layers may not be great individually, but when the absorption from the totality of light blocking layers is considered, good performance can be obtained without compromising mirror performance unduly.

Note that in this specification, a reference to a layer of a-Si:C:H or a-C:H having a higher refractive index should be taken to mean it has a refractive index of 2.6 or greater. Reference to a lower refractive index should be taken to mean the refractive index is less than 2.6.

When the OASLM of the current invention is written to with, for example, a laser beam, some of the light incident on the a-Si:C:H photoconductive layer will pass through it and be absorbed by the a-C:H light-blocking layer. Without this, the write light would tend to be reflected back to the photoconductive layer by the dielectric mirror and create an effective reduction in the resolution of the device. The reflected signal in this case would effectively be noise. A read light from a light source is inputted and transmitted through the liquid crystal layer. The transmitted light is precisely and efficiently reflected on the dielectric mirror layer made of alternating a-Si:C:H/a-C:H layers and is transmitted again through the liquid crystal layer. Accordingly, this device can obtain a high diffraction efficacy.

Further, according to the present invention there is provided an optical display system incorporating an OASLM, the OASLM comprising:
  a first transparent substrate;
  a first transparent electrode formed on said first transparent substrate;
  a photoconductive layer formed on the first transparent electrode and consisting of hydrogenated amorphous silicon carbide;
  a light-blocking layer formed on said photoconductive layer;
  a dielectric mirror layer, itself having a multiple layer structure formed on said light-blocking layer;
  A second transparent substrate upon which is formed a second transparent electrode, and between said second electrode and the dielectric mirror a liquid crystal layer and orientation means therefore;
  characterised in that the light blocking layer consists of hydrogenated amorphous carbon.

An OASLM made according to the current invention has a large number of uses in display systems. OASLMs are commonly employed as the final light modulation device in situations where a fine spatial resolution is needed. High quality projectors, and projectors that are used to display images having a three dimensional component, such as holographic displays and autostereoscopic displays, are typical display systems that often use OASLMs and the current invention will be of particular benefit to such systems.

Optical signal processing systems may use OASLMs as signal processing elements. An OASLM of the current invention may advantageously be employed in such a system.

Further, according to the present invention, there is provided a method of manufacturing an OASLM including the steps of:
  forming a first transparent electrode on a first transparent substrate;
  forming an hydrogenated amorphous silicon carbide (a-Si:C:H) photoconductive layer on a first transparent electrode;
  forming light-blocking layer on said photoconductive layer;
  forming a dielectric multilayer mirror based on alternating a-Si:C:H layers with higher refractive index and a-C:H layers with a lower refractive index, said mirror being formed on said light-blocking layer;
  characterised in that the light blocking layer consists of hydrogenated amorphous carbon (a-C:H).

The use of an a-C:H layer as a light-blocking layer along with a multilayer a-Si:C:H/a-C:H dielectric mirror in an OASLM with an a-Si:C:H photosensor is novel technical solution to the problem of optically decoupling the write and read light signals. The performance characteristics of an OASLM with such a structure is enhanced due to the following specific features of the fabrication technique and the properties of the a-Si:C:H and a-C:H films:
  the ability to vary the refractive index in a wide range (1.6–3.7) and, consequently, to decrease the mirror thickness;
  the ability to control the conductivity of the a-Si:C:H/a-C:H layers and hence match the electrical characteristics of the mirror to the other layers in the OASLM optimally;
  the fabrication of the dielectric multilayer mirror in a combined single technological cycle together with the photosensor (a-Si:C:H) and light-blocking (a-C:H) layers As the current invention uses similar processes for the manufacturing of the light blocking layer, the photosensor and the dielectric mirror, production is made much simpler, and reliability of the device is improved. There will be a much reduced tendency for the layers to separate, as can happen with the prior art.

The method of manufacture of the present invention preferably uses a Chemical Vapour Deposition (CVD) technique to put down the various layers. Preferably, a Plasma Activated CVD method is employed, although an Electron Spin Resonance CVD technique can also be used. These are all known methods, and details of their application will not be further discussed herein.

Further features and advantages will become apparent from the following and more particular description of the preferred embodiment of the invention, as illustrated in the accompanying drawings, in which:

FIG. 1 diagrammatically illustrates a cross sectional view of the layer arrangement of a reflective type liquid-crystal spatial light modulator in accordance with the present invention;

Figure 5:
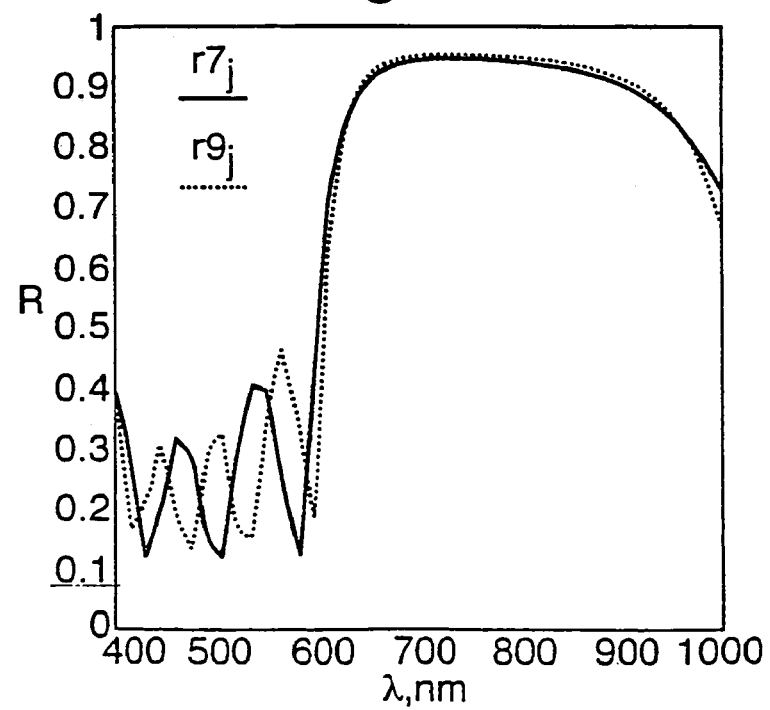

C:H/a-C:H in the interval of the wavelength 400–1000 nm. The refractive index of the a-Si:C:H layers is equal to 3.7 and the refractive index of a-C:H layers is equal to 1.7;

FIG. 5 shows the calculated reflectance spectra of both seven- and nine layer dielectric mirrors based on the a-Si: C:H/a-C:H layers in the interval of the wavelength 400–1000 nm. The refractive index of the a-Si:C:H layers is equal to 3.5 and the refractive index of a-C:H layers is equal to 1.6.

Figure 1:
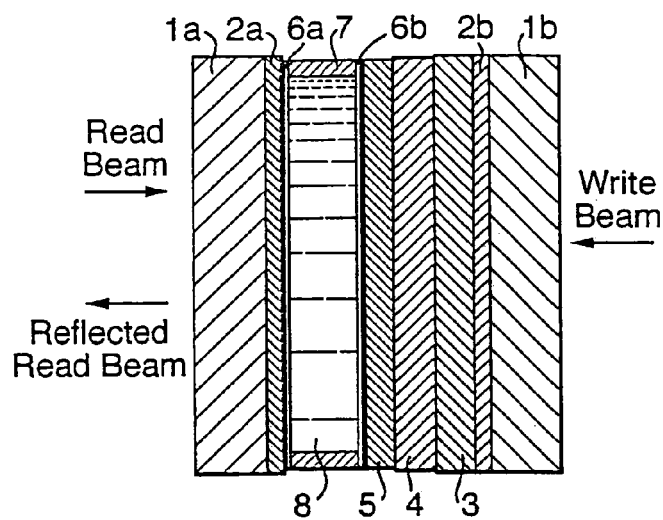

FIG. 1 shows a reflective type optically addressed liquid crystal modulator according to the present invention. In FIG. 1, the OASLM is provided with glass substrates 1a and 1b. Transparent electrodes 2a and 2b are disposed on the substrates 1a and 1b respectively. Each of the transparent electrodes 2a and 2b includes ITO (indium tin oxide) transparent conductive films, and is formed by means of a laser ablation.

A photoconductive layer 3 is disposed on the transparent electrode 2b. The photoconductive layer 3 is made of hydrogenated amorphous silicon carbide (a-Si:C:H) so that the impedance of the photoconductive layer 3 changes upon the application of light. The photoconductive layer 3 is formed by means of a plasma CVD (chemical vapour deposition) method.

A light-blocking layer 4 is disposed on the photoconductive layer 3. The light-blocking layer 4 is made of hydrogenated amorphous carbon (a-C:H), and has a layer thickness of about 0.5 μm. The light-blocking layer 4 prevents the write beam from reflecting at the dielectric mirror layer 5 and impinging again on the photoconductive layer 3, which would produce image degradation.

Since the light blocking layer 4 is made of hydrogenated amorphous carbon, its light absorbing ability is high. Thus, the effective image resolution of the modulator can be increased by the existence of the light absorbing layer 4. In addition, the adhesion between the photoconductive layer 3 made of hydrogenated amorphous silicon carbide and the light-blocking layer 4 is strong, and thus a detachment of those layers 3 and 4 from each other is prevented.

The dielectric mirror layer 5 is situated on the light blocking layer 4. The dielectric mirror layer 5 has a multiple layer structure, with layers alternating between higher and lower refractive indices. The higher refractive index layers are made of hydrogenated amorphous silicon carbide (a-Si: C:H) and the lower refractive index layers are made of hydrogenated amorphous carbon (a-C:H). The dielectric mirror layer 5 thus constructed has a good reflecting capability and increases the image resolution of the modulator. In addition, the dielectric mirror layer 5 thus constructed has an advantage in its simplified manufacturing process, since both of the layers can made in a combined single technological cycle together with the photosensitive (a-Si:C:H) and light-blocking (a-C:H) layers.

Orientation films 6a and 6b are applied to the transparent electrode 2a and the dielectric mirror layer 5. The substrates 1a and 1b are attached together by a sealing member 7. The liquid crystal layer 8 is situated between the orientation films 6a and 6b.

Figure 2:
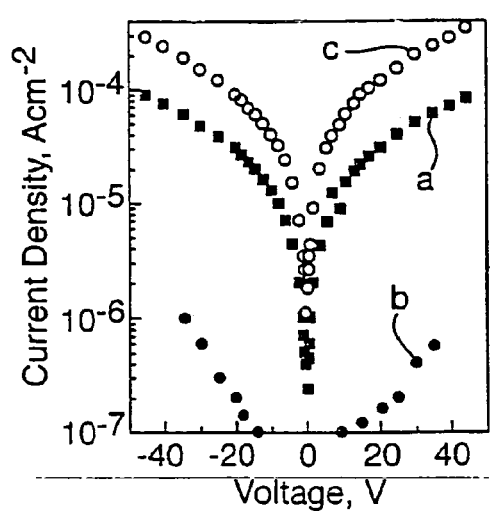
FIG. 2 shows the relationship between the dark current and photocurrent for the a-Si:C:H/a-C:H structure vs. the dc voltage.

Advantageously, many of the layers making up an OASLM have a high sheet resistance. This is the resistance between two parts of the same layer on the axis of the layer, and if this is high enough, any charge on one part of the layer is not dissipated across the layer. Too low a resistance will allow signal charge spread and reduce the resolution of the device. A high sheet resistance is particularly important in the photoconductor and light-blocking layers. FIG. 2 illustrates an influence of different sheet resistance on the density of dark and photocurrent of the ITO/a-Si:C:H/a-C:H thin-films structures. The plots a, b and c in FIG. 2 show the optimally matched voltage dependencies for a light attenuation factor of 100, and photocurrent to dark current ratios of 200 and 1000. Plot b is the dark current plot.

Figure 3:
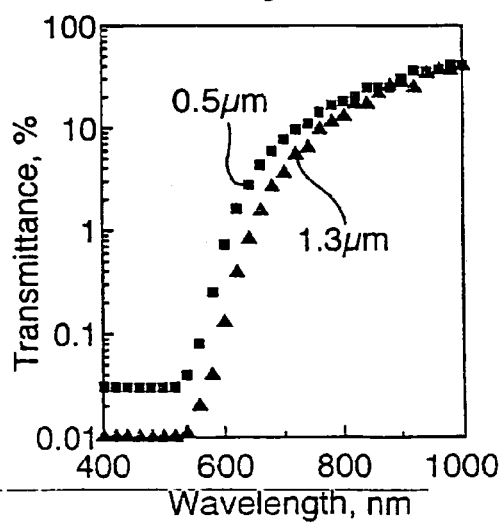
FIG. 3 depicts the spectral dependence of transmittance of the a-Si:C:H/a-C:H structures.

FIG. 3 illustrates the transmittance as a function of wavelength of the a-Si:C:H photoconductor coupled to the a-C:H light-blocking layer with $\alpha \sim 5 \times 10^4$ cm$^{-1}$ at $\lambda = 633$ nm. The a-C:H light-blocking layer with thick of 0.5 μm effectively isolates green light with $\lambda = 550$ nm. The transmittance reaches ~1% for red light, when the thickness of a-C:H layer is near 1 μm. The disadvantage with using too thick a a-C:H layer is that it causes a deterioration of the image spatial resolution in the reflective type OASLMs. The 0.5 μm thick a-C:H light-blocking layer and the dielectric mirror having reflectivity equal to 80% incorporated into an OASLM has been used to write and to read a diffraction grating at a wavelength of 633 nm. The intensity of read radiation was not found to affect the photoaddressing of the a-Si:C:H photoconductor.

Figure 4:
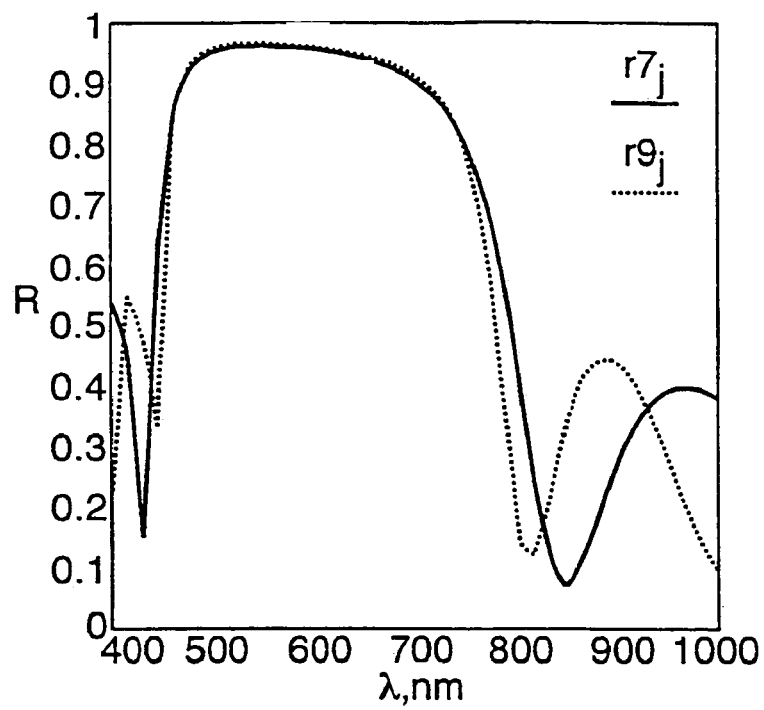
FIG. 4 shows the calculated reflectance spectra of both seven- and nine layer dielectric mirrors based on the a-Si.

To choose the optimal design of a multilayer dielectric mirror and to match its electrical and optical characteristics to the parameters of other layers in an OASLM, the reflective spectra as a function of refractive index and absorption coefficient of a-Si:C:H and a-C:H layers must be calculated. Advantageously, the refractive index of an a-Si:C:H layer within a dielectric mirror can be set between approximately 3.7 to approximately 3.3. The a-C:H layers with a lower refractive index of about 1.6–1.7 shows a lower absorption coefficient in the visible spectral range of about 0.01. If the application required a mirror where the a-C:H layers were to be used to provide some light blocking function as described above, then the absorption would be set to a higher figure than this. In FIG. 4 the calculated reflectance spectra of both seven and nine layer dielectric mirrors in the interval of the wavelength 400–1000 nm are shown. The refractive index of the a-Si:C:H and a-C:H layers are equal to 3.7 and 1.7 in this case, accordingly. In FIG. 5 the calculated reflectance spectra of seven and nine layers dielectric mirrors in the interval of the wavelength 400–1000 nm are shown. In this the refractive index of the a-Si:C:H and a-C:H layers are equal to 3.5 to 1.6. These parameters were chosen as being particularly practical to incorporate into the normal manufacturing process used when producing an a-Si:C:H/a-C:H dielectric mirror.

The examples of the reflective spectra in FIG. 4 and FIG. 5 are given for illustration purposes only and are not meant to limit the scope of claims in any way. Note that it is possible to use a layer with the larger index, however, in this case, its conductivity will be larger than the dark conductivity of the a-Si:C:H photosensitive layer, which may result in the image blurring. The mirrors with seven layers provide a peak reflectance of about 95%. The position of the maximum depends on the various layer thicknesses. Thus, theoretical calculations demonstrate that it is possible to fabricate multilayer mirrors with a-Si:C:H and a-C:H layers with the reflectance higher than 95% and with a thickness of about 0.5 μm.

A process for manufacturing a photoconductor/light-blocking layer/multilayer dielectric mirror structure of the OASLM will be explained below in sequence.

(A) The photoconductive layer 3 is formed on the transparent electrode 2b by a plasma CVD method. In this forming process, $SiH_4$ (silane), $H_2$ (hydrogen), and at least one of $CH_4$ (methane) or $C_2H_2$ (acetylene) are used as material gases. The thickness of the photoconductive layer 3 is typically about 1.5 μm.

(B) The light blocking layer 4 is formed on the photoconductive layer 3 by a plasma CVD method. In this forming process, acetylene is used as a material gas. Any hydrocarbon gas or liquid material including methane ($CH_4$) can be used too. The thickness of the light absorbing layer 4 is made in the interval from 0.5 to about 1 μm.

(C) The dielectric mirror layer 5 is formed on the light absorbing layer 4 by a plasma CVD method. In this forming process, $SiH_4$, $H_2$, and $CH_4$ are used as material gases to form the alternating a-Si:C:H layers with a higher refractive index. $CH_4$ or $C_2H_2$ gases are used as material gases for forming the a-C:H layers with lower refractive index.

The invention claimed is:

1. An optically addressed spatial light modulator (OASLM) comprising:
   a first transparent substrate; a first transparent electrode formed on said first transparent substrate;
   a photoconductive layer formed on the first transparent electrode comprising hydrogenated amorphous silicon carbide;
   a light-blocking layer formed on said photoconductive layer and comprising hydrogenated amorphous carbon;
   a dielectric mirror layer, itself having a multiple layer structure formed on said light-blocking layer;
   a second transparent substrate upon which is formed a second transparent electrode, and between said second electrode and the dielectric mirror a liquid crystal layer and orientation means therefore;
   wherein the light-blocking layer consists of hydrogenated amorphous carbon and wherein the dielectric mirror is formed from alternate hydrogenated amorphous silicon carbide (a-Si:C:H) layers and hydrogenated amorphous carbon (a-C:H) layers to form layers of higher and lower refractive index respectively.

2. An OASLM as claimed in claim 1 wherein the a-Si:C:H layers of the dielectric multilayer mirror have the higher refractive index in the interval from 3.7 to 3.3.

3. An OASLM as claimed in claim 1 wherein the a-C:H layers of the dielectric multilayer mirror have the lower refractive index in the interval from 1.5 to 1.8.

4. An OASLM as claimed in claim 1 wherein the a-C:H layers of the dielectric multilayer mirror have the lower refractive index in the interval from 1.6 to 1.7.

5. An OASLM as claimed in claim 1 wherein the conductivities of dielectric mirror layers is in the range from $10^{-9}$ to $10^{-12}$ $Ohm^{-1}cm^{-1}$.

6. An OASLM as claimed in claim 1 wherein the Dielectric mirror has seven layers.

7. An OASLM as claimed in claim 1 wherein the light blocking layer has a thickness of between the limits of 0.4 μm and 0.6 μm.

8. An OASLM as claimed in claim 1 wherein at least one of the layers of the dielectric mirror having a lower refractive index is so formed to be partially light blocking.

9. An OASLM as claimed in claim 1 wherein the refractive index of the dielectric mirror a-Si:C:H layers is 3.5 and the refractive index of the dielectric mirror a-C:H layers is 1.6.

10. An optical display system incorporating an OASLM, the OASLM comprising:
    a first transparent substrate;
    a first transparent electrode formed on said first transparent substrate;
    a photoconductive layer formed on the first transparent electrode the photoconductive layer comprising hydrogenated amorphous silicon carbide;
    a light-blocking layer formed on said photoconductive layer;
    a dielectric mirror layer, itself having a multiple layer structure formed on said light-blocking layer;
    a second transparent substrate upon which is formed a second transparent electrode, and between said second electrode and the dielectric mirror a liquid crystal layer and orientation means therefore; wherein the light blocking layer consists of hydrogenated amorphous carbon and wherein the dielectric mirror is formed from alternate hydrogenated amorphous silicon carbide (a-Si:C:H) layers and hydrogenated amorphous carbon (a-C:H) layers to form layers of higher and lower refractive index respectively.

11. An optical display system as claimed in claim 10 wherein the display system is capable of displaying a holographic diffraction grating.

12. An optical signal processing system incorporating an OASLM, the OASLM comprising:
    a first transparent substrate;
    a first transparent electrode formed on said first transparent substrate;
    a photoconductive layer formed on first transparent electrode the photoconductive layer comprising hydrogenated amorphous silicon carbide;
    a light-blocking layer formed on said photoconductive layer the light-blocking layer comprising hydrogenated amorphous carbon;
    a dielectric mirror layer, itself having a multiple layer structure formed on said light-blocking layer;
    a second transparent substrate upon which is formed a second transparent electrode, and between said second electrode and the dielectric mirror a liquid crystal layer and orientation means therefore; wherein the light blocking layer consists of hydrogenated amorphous carbon and wherein the dielectric mirror is formed from alternate hydrogenated amorphous silicon carbide (a-Si:C:H) layers and hydrogenated amorphous carbon (a-C:H) layers to form layers of higher and lower refractive index respectively.

13. An optically addressed spatial light modulator (OASLM) comprising:
    a first transparent substrate;
    a first transparent electrode formed on said first transparent substrate;
    a photoconductive layer formed on the first transparent electrode, the photoconductive layer comprising hydrogenated amorphous silicon carbide;
    a light-blocking layer formed on said photoconductive layer, the light-blocking layer comprising hydrogenated amorphous carbon;
    a dielectric mirror layer, itself having a multiple layer structure of higher and lower refractive index material so formed as to be partially light blocking; and
    a second transparent substrate upon which is formed a second transparent electrode, and between said second electrode and the dielectric mirror a liquid crystal layer and orientation means therefore wherein the light-blocking layer includes hydrogenated amorphous carbon.

* * * * *